United States Patent [19]

Boyes

[11] 4,430,371
[45] Feb. 7, 1984

[54] WOOD VENEERS

[75] Inventor: David Boyes, Harrogate, England

[73] Assignee: Gerhard Kosche, Much, Fed. Rep. of Germany

[21] Appl. No.: 341,759

[22] Filed: Jan. 22, 1982

[30] Foreign Application Priority Data

Jan. 23, 1981 [GB] United Kingdom ............... 8102085

[51] Int. Cl.³ ........................... B27D 1/10; B32B 3/00
[52] U.S. Cl. ...................................... 428/61; 144/350; 144/351; 156/304.3; 156/304.5; 428/191; 428/286; 428/332
[58] Field of Search ...................... 428/57, 58, 61, 191, 428/286, 332; 156/304.5, 304.3, 304.1; 144/345, 347, 350, 351

[56] References Cited

U.S. PATENT DOCUMENTS 2,070,527  2/1937  Elmendorf ........................ 428/247
3,046,181  7/1962  Mann et al. ..................... 156/304.5
3,985,169 10/1976  Chow ............................. 156/304.5
4,205,107  5/1980  Jaschke et al. ..................... 428/58

Primary Examiner—Paul J. Thibodeau
Attorney, Agent, or Firm—Brisebois & Kruger

[57] ABSTRACT

A continuous length of flexible, reel wood veneer produced by a method according to which the veneer leaves are bonded to a non-woven material strip such as bonded viscose rayon which is then severed between the veneer leaves to form foil backed leaves, which leaves are cut with male and female finger ends enabling said leaves to be mated end to end and bonded together into a continuous length, and a plastics or plastics composite foil such as PVC/non-woven material composite foil is applied as secondary backing to the non-woven material-backed veneer, which preferably has a total thickness of about 0.40 mm, including a real wood veneer thickness of 0.15 mm.

6 Claims, 1 Drawing Figure

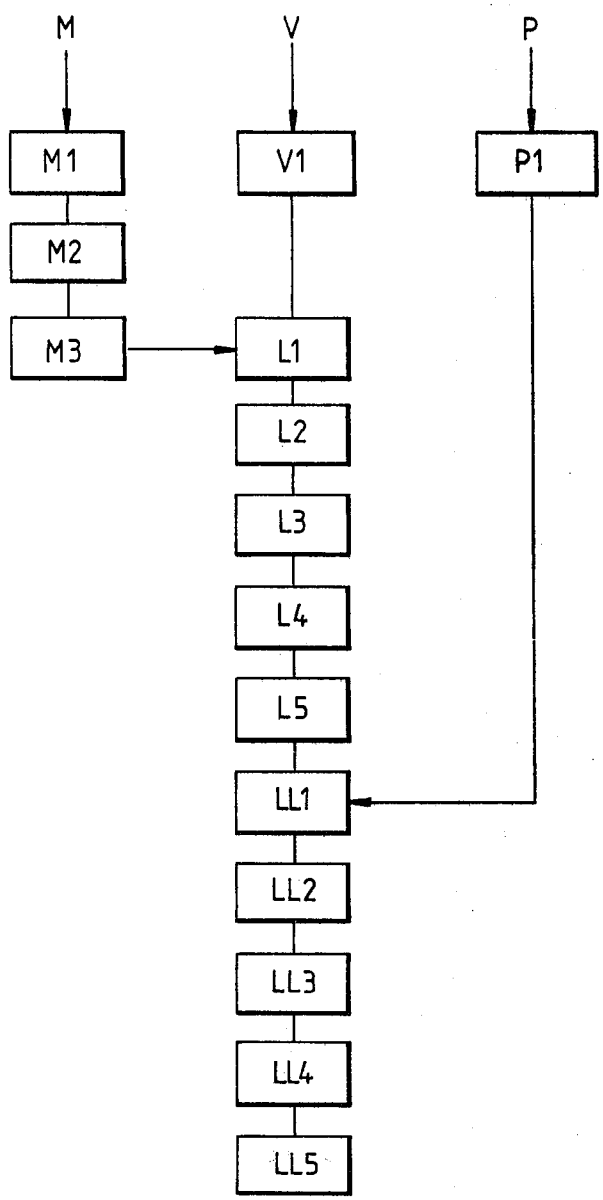

WOOD VENEERS

FIELD OF THE INVENTION

This invention relates generally to wood veneers and in particular to a continuous length of flexible wood veneer and to a method of production thereof.

In this specification and the appended claims, references to wood veneers means "real wood" veneers, and not simulated wood veneers of plastics material.

BACKGROUND TO THE DISCLOSURE

Originally, moulded wood sections had to be manufactured in random discrete lengths of the desired timber. This expensive original method was replaced by techniques involving the application of discrete lengths of veneer to a cheaper wood stock of softwood, chipboard, fibreboard, hollow plastics section or the like. Real wood veneer laminates hitherto have been too thick for use on mouldings and like complicated shapes, for which veneers per se, i.e. non-laminated veneers, have been required.

However, currently available non-laminated veneers are not suitable for complicated mouldings, because from the handling point of view it has been necessary to use relatively thick, say 0.6 mm, veneers, which tend to split if comformed to sharply curved surfaces. In other words, the necessity to provide veneers of a sufficient thickness for ready handling automatically results in veneers of limited flexibility, so that they can only be used on simple sections.

Additionally, there is the problem of matching the normally distributed, naturally occurring lengths of veneer to the user requirement for fixed length mouldings, which results in a considerable yield loss in the use of expensive veneers.

OBJECT OF THE INVENTION

It is an object of this invention to provide a flexible wood veneer and method of production thereof which substantially avoids or minimises the problems which arise with existing veneers.

BRIEF SUMMARY OF INVENTION

According to one aspect of the present invention, there is provided a flexible wood veneer comprising a series of veneer leaves backed by non-woven flexible material, said non-woven material backed veneer leaves being butted and bonded together end to end through mating finger joints to form a flexible veneer strip of thickness not exceeding 0.55 mm.

The present invention enables the production of especiallly flexible, thin, real wood veneer by backing the thin veneer leaves before formation, butting and bonding of the finger joints, thus avoiding any requirement for complex handling of the unbacked and therefore fragile veneer leaves themselves, both during manufacture of the veneer strip and during subsequent use.

Preferably, a backing of a plastics or plastics composite foil is applied to the non-woven material on the side thereof opposite to the veneer leaves.

In a preferred veneer:
 (a) the veneer leaves are between 0.1 and 0.35 mm thick;
 (b) the flexible non-woven material strip is between 0.05 and 0.15 mm thick;
 (c) the plastics or plastics composite foil is between 0.05 and 0.2 mm thick;
 (d) the veneer has an overall thickness of between 0.25 mm and 0.55 mm, preferably an overall thickness of approximately 0.40 mm, consisting of 0.15 mm veneer leaves thickness, 0.1 mm non-woven material thickness and 0.15 mm plastics or plastics composite foil thickness.

According to a second aspect of the invention, there is provided a method of producing the above-defined flexible wood veneer, according to which thin leaves of veneer are bonded to a thin strip of non-woven material, the strip is severed at the joints between the veneer leaves, male and female finger ends are cut at opposite ends of the severed non-woven material-backed leaves, the male and female ends of the foil-backed leaves are mated to form finger joints between a succession of said leaves, and the finger joints are bonded to form the required strip of flexible wood.

Preferably, the bonded, finger jointed, non-woven material-backed veneer is bonded to a continuous length of plastics or plastics composite foil.

BRIEF DESCRIPTION OF DRAWING

The accompanying drawing is a flow diagram of the preferred method of manufacturing the continuous wood veneer in accordance with the invention.

DESCRIPTION OF EMBODIMENT

The input at M is a non-woven material 0.1 mm thick. One material specifically suitable is a viscose rayon fibre bonded with an acrylic emulsion adhesive, which is available in 500 m rolls 1.27 m wide.

The input at V consists of bundles (usually 64 leaves) of veneers of timber. Various types of real wood are available in such veneer bundles, the length and width of a bundle being normally distributed and the parameters of the distribution depending on the species of timber. Conveniently, veneer leaves of 0.25 mm thickness are employed, although thicknesses anywhere in the range 0.2 mm to 0.6 mm can be handled.

The input at P is a flexible foil 0.15 mm thick, conveniently a polyvinylchloride/non-woven material composite foil which is available in particular as Storoflex 401×, in 250 m rolls 1.27 m wide.

The processing of the veneer leaves will be described first. At V1, the veneers are trimmed by guillotining, bundle by bundle, to a range of standard widths. The ends of the bundles are also trimmed to remove undesirable split ends, mineral stains or other blemishes. A bundle having an unacceptable blemish such as a knot hole between its ends can be cut into two shorter bundles to exclude such blemish.

Stage V1 may be followed by an optional stage (not shown) at which the leaves of bundles narrower than the minimum width required at output are jointed side by side using an acrylic emulsion adhesive. The longitudinal edge jointed leaves are then handled in the same way as full width bundles.

Turning now to the input M, at M1 an acrylic emulsion adhesive (Rohm & Haas AC 61) is applied to the web of non-woven material using a reciprocating spray gun. The adhesive sprayed material proceeds via a string conveyor through a steam heated forced drying zone and is then rewound. The operation is repeated at M2 to increase the adhesive deposition.

At M3 the adhesive coated roll is slit across its width to produce a number of narrower rolls of appropriate width to suit production requirements and maximise yields.

At L1 occurs the first laminating stage. A number of non-woven material rolls from M3 are set up on unwind shafts to be passed over a table and then between the platens of a heated hydraulic press. A convenient press is 1.3 m wide and 3 m long, operating at 120° Centigrade to apply a specific pressure of 70 lb/in$^2$. A wind-up device follows the press. The veneers from V1 are laid on to the non-woven material when it passes over the table, with one bundle of veneers feeding each web of such material. Operation of the wind-up device feeds the non-woven material web with veneer into the press, where it is subjected to a 25 second pressing cycle. At this time more veneers are being laid on newly exposed lengths of non-woven material web on the table, and thus the cycle is repeated. The non-woven material webs are then rewound, thus producing a number of non-woven material rolls with the veneer leaves firmly attached in end to end butted relationship.

Each roll is now cut into individual leaves of non-woven material-backed veneer, by cutting through the butt joints between the individual leaves. This is stage L2.

Now, at stage L3, each non-woven material-backed veneer leaf has a finger pattern cut at its opposite ends, respectively by male and female dies. The fingers permit the individual leaves to be pushed together end to end to form a well camouflaged butt joint.

This is effected at L4, where the fingers of two leaves are mated together under a piece of clear perspex. When a satisfactory joint of good appearance has been achieved, the perspex is removed and an acrylic emulsion adhesive (e.g. Rohm and Haas AC61) is stippled into the joint. The adhesive is cured by swinging a small press over the joint area and subjecting the joint to a pressure of 70 lb/in$^2$ for 5 secs, at a temperature of 120° C. The adhesive is prevented from sticking to the press by sheets of glass-reinforced P.T.F.E. positioned between the material and the press platens. This produces: (a) a glued finger joint within the thickness of the material and (b) a final camouflaging of any imperfections in the finger joint. A third leaf is added, and so on in similar manner. The resulting strip is wound into a roll, say a 250 m roll.

Thus, at the completion of this stage there results 250 m rolls of finger-jointed, non-woven material-backed veneer wherein the substantially invisible joints are as strong as the body of the material. The rolls are oven dried at stage L5.

Turning now to the input P, at P1 the PVC composite foil roll is unwound, slit across its width and rewound into a number of 250 m rolls each of an appropriate width to suit production requirements and consistent with minimum waste.

Now, at stage LL1, the continuous rolls of non-woven material-backed veneer from L5 and the continuous rolls of plastics composite foil from P1 are bonded together, foil against non-woven material, in an hydraulic press operating at 120° Centigrade at a specific pressure of 70 lb/in$^2$ for a pressing cycle of 25 seconds. The resulting laminate has an internal peel strength of 5 to 6 lbs/in.

The material is then sanded to remove approximately 0.1 mm from the veneer thickness. This is stage LL2, which is followed by inspection stage LL3.

Inspection at LL3 enables defects to be removed by repeating the steps of the process previously described with reference to stages L3 to L4, before proceeding with a perfect roll to the final stages of the method.

At LL4, the longitudinal edges of the triple layer laminate veneer are trimmed to remove the roughnesses or unevenesses which inevitably result from imperfect registration whilst laminating, and also to bring the material to the exact width required.

Finally, at LL5, the rolls of backed veneer are packed into cartons which are purpose made to accommodate a range of roll widths.

The above-described method provides a continuous length of veneer with a flexible backing enabling it readily to be conformed to contoured surfaces, such for example as complicated moulded profiles, without handling difficulties.

I claim:

1. A flexible wood veneer comprising a series of veneer leaves backed by a non-woven adhesive-absorbent backing material secured to the leaves by adhesive absorbed in the backing, said non-woven material backed veneer leaves being in butted-together end to end relation at mating finger joints, said finger joints of both the adjoining ends of the veneer leaves and the adjoining ends of the non-woven material backing being bonded together by adhesive between the finger joints, and a continuous plastics composite foil adhered to a rear surface of the non-woven backing material by the adhesive absorbed in the non-woven backing material to form a triple laminate with the non-woven material constituting the intermediate layer of the laminate.

2. A flexible wood veneer according to claim 1 wherein said adhesive absorbed in the backing and said adhesive between the finger joints comprises a hot melt adhesive.

3. A veneer according to claim 1, wherein the foil is a PVC/non-woven material composite foil.

4. A veneer according to claim 3, wherein the non-woven material strip is a bonded, viscose rayon fibre.

5. A veneer according to claim 4, wherein the veneer leaves are between 0.1 and 0.35 mm thick, the flexible strip of non-woven material is between 0.05 and 0.15 mm thick and, the plastics composite foil is between 0.05 and 0.2 mm thick, the veneer strip having an overall thickness of between 0.25 mm and 0.55 mm.

6. A veneer according to claim 5, having an overall thickness of approximately 0.40 mm, consisting of 0.15 mm veneer leaves thickness, 0.1 mm non-woven material thickness and 0.15 mm plastics composite material thickness.

* * * * *